United States Patent
Ohyama et al.

(10) Patent No.: US 9,893,347 B2
(45) Date of Patent: Feb. 13, 2018

(54) ALLOY POWDER FOR ELECTRODE, NEGATIVE ELECTRODE FOR ALKALINE STORAGE BATTERY USING THE SAME, AND ALKALINE STORAGE BATTERY

(71) Applicant: PANASONIC CORPORATION, Osaka (JP)

(72) Inventors: Hideaki Ohyama, Osaka (JP); Shinichi Sumiyama, Osaka (JP); Akiko Okabe, Osaka (JP); Yasushi Nakamura, Osaka (JP); Kiyoshi Hayashi, Osaka (JP); Fumio Kato, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 534 days.

(21) Appl. No.: 14/380,324

(22) PCT Filed: Dec. 5, 2013

(86) PCT No.: PCT/JP2013/007167
§ 371 (c)(1),
(2) Date: Aug. 21, 2014

(87) PCT Pub. No.: WO2014/118846
PCT Pub. Date: Aug. 7, 2014

(65) Prior Publication Data
US 2015/0010812 A1    Jan. 8, 2015

(30) Foreign Application Priority Data
Jan. 29, 2013    (JP) .................. 2013-014260

(51) Int. Cl.
*H01M 4/24*    (2006.01)
*H01M 10/24*    (2006.01)
(Continued)

(52) U.S. Cl.
CPC ........... *H01M 4/242* (2013.01); *C22C 1/0433* (2013.01); *C22C 1/0483* (2013.01);
(Continued)

(58) Field of Classification Search
CPC ................... H01M 4/383; H01M 4/38
See application file for complete search history.

(56) References Cited

U.S. PATENT DOCUMENTS 6,338,916 B1    1/2002 Irie et al.
6,475,664 B1    11/2002 Kawakami et al.
(Continued)

FOREIGN PATENT DOCUMENTS

CN    1065353 A  *  10/1992
CN    101589491 A    11/2009
(Continued)

OTHER PUBLICATIONS

Urand-Charre, Madeleine. The Microstructure of Superalloys. Boca Raton, FL.: CRC, 1997. Web. Mar. 21, 2017.*
(Continued)

*Primary Examiner* — Colleen Dunn
*Assistant Examiner* — Jeremy Jones
(74) *Attorney, Agent, or Firm* — McDermott Will & Emery LLP

(57) ABSTRACT

Provided is an alloy powder for an electrode which enables an alkaline storage battery to have both excellent discharge characteristics and excellent life characteristics. The alloy powder includes a hydrogen storage alloy including an element L, Mg, Ni, Al, and an element $M^a$. The element L is at least one selected from the group consisting of group 3 elements and group 4 elements of the periodic table (excluding Y). The element $M^a$ is at least two selected from the group consisting of Ge, Y, and Sn. A molar proportion x of Mg in a total of the element L and Mg is $0.008 \leq x \leq 0.54$. A (Continued)

molar proportion y of Ni, a molar proportion α of Al, and a molar proportion β of the element $M^\alpha$, per the foregoing total is $1.6 \leq y \leq 4$, $0.008 \leq \alpha \leq 0.32$, and $0.01 \leq \beta \leq 0.12$, respectively.

15 Claims, 1 Drawing Sheet

(51) Int. Cl.

| | | |
|---|---|---|
| *C22C 28/00* | (2006.01) | |
| *H01M 4/38* | (2006.01) | |
| *C22C 1/04* | (2006.01) | |
| *H01M 4/42* | (2006.01) | |
| *H01M 4/46* | (2006.01) | |
| *H01M 10/30* | (2006.01) | |
| *H01M 10/32* | (2006.01) | |
| *C22C 19/00* | (2006.01) | |
| *C22C 30/00* | (2006.01) | |
| *H01M 4/02* | (2006.01) | |
| *B22F 9/08* | (2006.01) | |
| *B22F 9/04* | (2006.01) | |

(52) U.S. Cl.
CPC ............ *C22C 19/007* (2013.01); *C22C 28/00* (2013.01); *C22C 30/00* (2013.01); *H01M 4/244* (2013.01); *H01M 4/248* (2013.01); *H01M 4/38* (2013.01); *H01M 4/383* (2013.01); *H01M 4/386* (2013.01); *H01M 4/42* (2013.01); *H01M 4/46* (2013.01); *H01M 10/24* (2013.01); *H01M 10/30* (2013.01); *H01M 10/32* (2013.01); *B22F 9/082* (2013.01); *B22F 2009/041* (2013.01); *B22F 2998/10* (2013.01); *H01M 2004/027* (2013.01)

(56) References Cited

U.S. PATENT DOCUMENTS

| | | | |
|---|---|---|---|
| 7,740,983 B2* | 6/2010 | Kihara | ................ C01B 3/0057 429/218.2 |
| 8,202,650 B2 | 6/2012 | Ohyama et al. | |
| 9,343,742 B2* | 5/2016 | Kihara | ................ C01B 3/0057 |
| 2003/0124425 A1 | 7/2003 | Akita et al. | |
| 2010/0009259 A1 | 1/2010 | Ohyama et al. | |
| 2010/0028774 A1* | 2/2010 | Ohyama | ................ C22C 9/02 429/206 |
| 2012/0164527 A1* | 6/2012 | Saguchi | ................ H01M 4/242 429/206 |
| 2014/0120411 A1* | 5/2014 | Kihara | ................ C01B 3/0057 429/163 |

FOREIGN PATENT DOCUMENTS

| | | | |
|---|---|---|---|
| CN | 102226243 A | | 10/2011 |
| EP | 1026764 A2 | | 8/2000 |
| EP | 1093171 A2 | | 4/2001 |
| EP | 2469628 A1 | | 6/2012 |
| JP | 11029832 A | * | 2/1999 |
| JP | 2000-228191 A | | 8/2000 |
| JP | 2000-265229 A | | 9/2000 |
| JP | 2000265229 A | * | 9/2000 |
| JP | 2001-148244 A | | 5/2001 |
| JP | 2002-164045 A | | 6/2002 |
| JP | 2003-187804 A | | 7/2003 |
| JP | 2012-134110 A | | 7/2012 |
| WO | 2009-037806 A1 | | 3/2009 |

OTHER PUBLICATIONS

International Search Report issued in PCT/JP2013/007167, dated Feb. 4, 2014, with English translation.

Chinese Office Action issued in corresponding Chinese Patent Application No. 201380009382.8, dated Jun. 3, 2016; with partial English translation.

Chinese Office Action with partial English Translation issued in corresponding Chinese Patent Application No. 201380009382.8 dated Dec. 5, 2013.

* cited by examiner

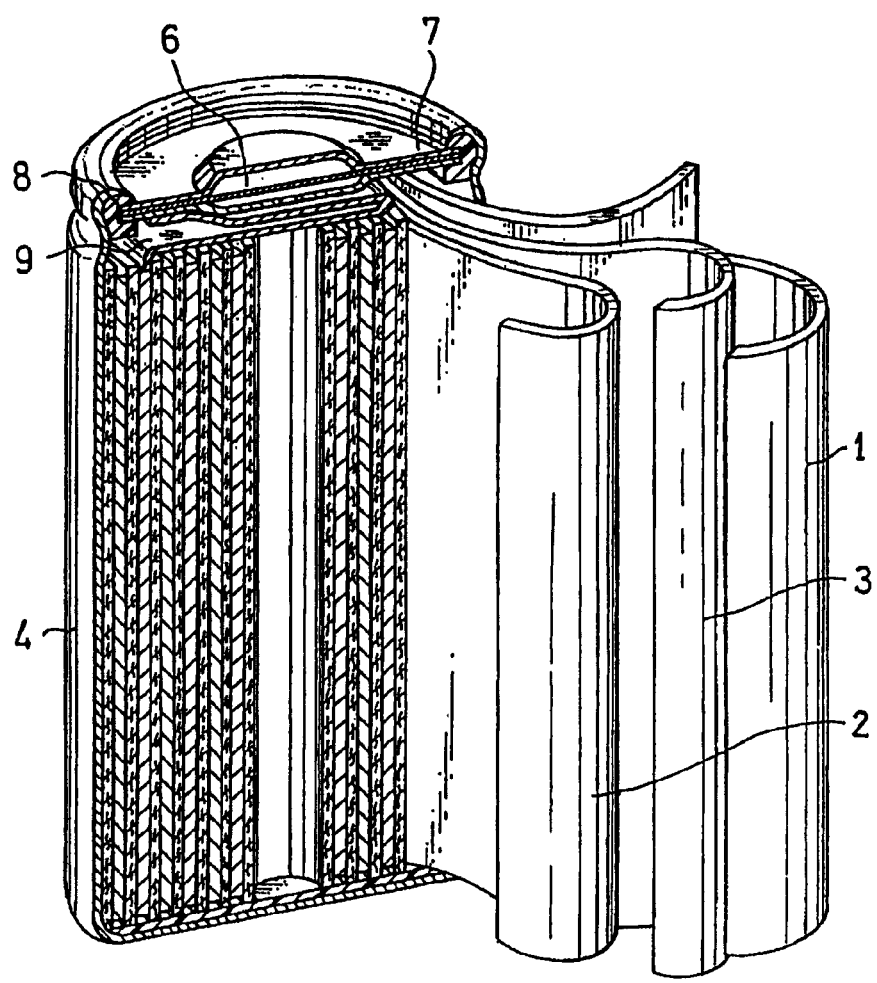

ALLOY POWDER FOR ELECTRODE, NEGATIVE ELECTRODE FOR ALKALINE STORAGE BATTERY USING THE SAME, AND ALKALINE STORAGE BATTERY

RELATED APPLICATIONS

This application is the U.S. National Phase under 35 U.S.C. § 371 of International Application No. PCT/JP2013/007167, filed on Dec. 5, 2013, which in turn claims the benefit of Japanese Application No. 2013-014260, filed on Jan. 29, 2013, the disclosures of which Applications are incorporated by reference herein.

TECHNICAL FIELD

The present invention relates to an alloy powder for an electrode, a negative electrode for an alkaline storage battery using the same, and an alkaline storage battery; and specifically relates to an improvement of an alloy powder for an electrode including a hydrogen storage alloy including Mg.

BACKGROUND ART

Alkaline storage batteries which use a negative electrode including a hydrogen storage alloy as a negative electrode active material, has high output characteristics as well as high durability (in terms of, for example, life characteristics and/or storage characteristics). Therefore, attention is being focused on such alkaline storage batteries as, for example, alternatives for dry-cell batteries and a power source for, for example, electric vehicles. However, in recent years, lithium-ion secondary batteries have also been used for such purposes. Therefore, in view of emphasizing the advantages of alkaline storage batteries, battery characteristics such as output characteristics and durability are expected to be further improved.

For the hydrogen storage alloy, a hydrogen storage alloy having a $CaCu_5$-type crystal structure has been primarily used. When a high alloy capacity is required, a hydrogen storage alloy including a $Ce_2Ni_7$-type or $CeNi_3$-type crystal structure has been used. To improve battery characteristics of alkaline storage batteries, attempts have been made to optimize the abilities of the hydrogen storage alloy in powder form.

For example, Patent Literature 1 proposes using a hydrogen storage alloy including an element A such as La or Mg and an element B such as Co or Ni, in a negative electrode for an alkaline secondary battery. For the element B, Ge, Sn, and other elements are also given as examples.

Patent Literature 2 proposes adding an oxide or hydroxide of Ge to a negative electrode for a nickel-metal hydride battery which uses a hydrogen storage alloy, such that the amount of Ge in the hydrogen storage alloy falls in the range of 0.01 to 2 weight %.

Patent Literature 3 discloses an alkaline secondary battery in which a negative electrode includes as a main component a Mg—Ni alloy including an amorphous phase capable of absorbing and releasing hydrogen, the Mg—Ni alloy surface covered with a layer of an insulating material including a hydrate or hydroxide including Mg and, for example, Ge.

CITATION LIST

Patent Literature

[Patent Literature 1] Japanese Laid-Open Patent Publication No. 2000-228191

[Patent Literature 2] Japanese Laid-Open Patent Publication No. 2003-187804

[Patent Literature 3] Japanese Laid-Open Patent Publication No. 2001-148244

SUMMARY OF INVENTION

Technical Problem

Presumably, the element B, for example, Ge or Sn, included in the hydrogen storage alloy in Patent Literature 1 is theoretically capable of forming a covalent hydride that is relatively stable. Moreover, elements such as Ge and Sn have little impact on the environment. However, from Patent Literature 1, it is difficult to select a specific composition for the hydrogen storage alloy including Ge or Sn. Moreover, the hydrogen storage alloy including Sn is presented in each of the Examples and Comparative Examples, and the effect due to the hydrogen storage alloy including the element B is not made clear.

In Patent Literature 2, Ge is added to the negative electrode in the form of a hydroxide or oxide, to prevent elution of Ge metal included in the negative electrode and thus degradation of discharge characteristics of the negative electrode. However, an oxide or hydroxide of Ge is less active than Ge metal, and thus reactivity of the negative electrode may become insufficient.

In Patent Literature 3, since the Mg—Ni alloy surface is covered with a layer of, for example, a Ge hydroxide, deterioration of the alloy due to the electrolyte can presumably be suppressed to a certain extent. However, a layer of a Ge hydroxide or the like does not contribute to a battery reaction.

Note that when a hydrogen storage alloy becomes less active, a battery reaction progresses with difficulty particularly at a low temperature, and thus low-temperature discharge characteristics degrade. Moreover, deterioration of a hydrogen storage alloy occurs significantly at a high temperature.

Solution to Problem

An object of the present invention is to provide an alloy powder for an electrode which enables an alkaline storage battery to obtain both excellent discharge characteristics and excellent life characteristics.

One aspect of the present invention relates to an alloy powder for an electrode comprising a hydrogen storage alloy, the hydrogen storage alloy including an element L, Mg, Ni, Al, and an element $M^\alpha$, the element L being at least one selected from the group consisting of group 3 elements and group 4 elements of the periodic table, excluding Y, the element $M^\alpha$ being at least two selected from the group consisting of Ge, Y, and Sn, a molar proportion x of Mg in a total of the element L and Mg being $0.008 \leq x \leq 0.54$, a molar proportion y of Ni per the total of the element L and Mg being $1.6 \leq y \leq 4$, a molar proportion α of Al per the total of the element L and Mg being $0.008 \leq \alpha \leq 0.32$, and a molar proportion β of the element $M^\alpha$ per the total of the element L and Mg being $0.01 \leq \beta \leq 0.12$.

Another aspect of the present invention relates to a negative electrode for an alkaline storage battery including the foregoing alloy powder for an electrode as a negative electrode active material.

Still another aspect of the present invention relates to an alkaline storage battery comprising:
a positive electrode;
a negative electrode;
a separator interposed between the positive electrode and the negative electrode; and
an alkaline electrolyte,
the negative electrode being the foregoing negative electrode for an alkaline storage battery.

Advantageous Effects of Invention

According to the present invention, due to the hydrogen storage alloy including at least two selected from the group consisting of Ge, Y, and Sn, in addition to the element L, Mg, Ni, and Al, the alloy surface can be made highly active when the alloy is used in an alkaline storage battery. Thus, high discharge characteristics can be obtained in an alkaline storage battery. Moreover, since deterioration of the alloy can be suppressed, excellent life characteristics is obtained. Therefore, according to the present invention, it is possible to obtain both high discharge characteristics and excellent life characteristics.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF DRAWING

FIG. 1 is a schematic, vertical sectional view of the structure of an alkaline storage battery according to an embodiment of the present invention.

DESCRIPTION OF EMBODIMENTS (Alloy Powder for Electrode)

An alloy powder for an electrode of the present invention includes a hydrogen storage alloy; and the hydrogen storage alloy includes an element L, Mg, Ni, Al, and an element $M^a$. Here, the element L is at least one selected from the group consisting of group 3 elements and group 4 elements of the periodic table (excluding Y); and the element $M^a$ is at least two selected from the group consisting of Ge, Y, and Sn. A molar proportion x of Mg in the total of the element L and Mg is $0.008 \leq x \leq 0.54$. A molar proportion y of Ni, a molar proportion $\alpha$ of Al, and a molar proportion $\beta$ of the element $M^a$, per the total of the element L and Mg, are $1.6 \leq y \leq 4$, $0.008 \leq \alpha \leq 0.32$, and $0.01 \leq \beta \leq 0.12$, respectively.

The hydrogen storage alloy is capable of electrochemically absorbing and releasing hydrogen, and due to such function, the alloy is used as an electrode active material in an alkaline storage battery. To increase the hydrogen-absorbing ability and the hydrogen-releasing ability of the hydrogen storage alloy, the alloy surface needs to be active. However, if the alloy surface is highly active, the component elements of the alloy would be eluted and the alloy would deteriorate, thereby shortening battery life. That is, in an alkaline storage battery, there is a trade-off relation between discharge characteristics (or charge/discharge characteristics) and life characteristics, and it is difficult for both to be obtained at a high level.

If the hydrogen storage alloy is less active, charge/discharge would not readily occur, particularly at a low temperature. Therefore, low-temperature discharge characteristics (or low-temperature charge/discharge characteristics) would tend to degrade. Moreover, elution of the component elements from the alloy occurs significantly at a high temperature. Therefore, if the hydrogen storage alloy is excessively active, cycle life would tend to degrade after the battery is stored at a high temperature. Therefore, in a conventional alkaline storage battery, it is difficult to obtain both high low-temperature discharge characteristics and excellent high-temperature life characteristics.

In the present invention, due to the hydrogen storage alloy including a specific amount of the element $M^a$ being at least two selected from the group consisting of Ge, Y, and Sn, in addition to the element L, Mg, Ni, and Al, the alloy surface can be made highly active; and also, elution of the component elements can be suppressed. The reason for the foregoing is not clear, but the increased activity at the alloy surface is presumably due to formation of a catalyst layer including at least some of the elements forming the element $M^a$, such as Ge, on the alloy surface. Note that the catalyst layer may include clusters which include the element $M^a$. Moreover, elution of the component elements is suppressed presumably due to formation of a protective film of the component(s) including the element $M^a$ (e.g., a film of a composite oxide and/or a composite hydroxide) on the alloy surface.

As the foregoing, in the present invention, the surface of the hydrogen storage alloy can be made highly active, and thus discharge characteristics such as low-temperature discharge characteristics can be improved. Moreover, due to improvement in elution-resisting abilities of the component elements of the hydrogen storage alloy, deterioration of the alloy can be suppressed, and thus improvement in life characteristics is possible even after high-temperature storage. Therefore, long-term reliability of the battery can be improved.

Moreover, in the present invention, due to the respective molar proportions of the elements in the hydrogen storage alloy being in the foregoing ranges, the electrode capacity can be increased; and as a result, the battery capacity can be increased.

Regarding the element L in the hydrogen storage alloy, examples of the group 3 elements of the periodic table include elements excluding Y, i.e., Sc, the lanthanide elements, and the actinide elements. The lanthanide elements include La, Ce, Pr, Nd, Pm, Sm, Eu, Gd, Tb, Dy, Ho, Er, Tm, Yb, and Lu. Examples of the actinide elements include Ac, Th, Pa, and Np.

Regarding the element L, examples of the group 4 elements of the periodic table include Ti, Zr, and Hf.

Among the foregoing elements, Sc, the lanthanide elements, Ti, and Zr are preferable. Among the lanthanide elements, La, Ce, Pr, Nd, and Sm are preferable, La and Sm in particular. The element L includes at least a lanthanide element (at least La in particular). Alternatively, the element L may include a lanthanide element and Sc and/or a group 4 element of the periodic table.

The molar proportion x of Mg in the total of the element L and Mg is 0.008 or more, preferably 0.009 or more, and further preferably 0.01 or more or 0.25 or more. Moreover, the molar proportion x is 0.54 or less, preferably 0.52 or less, and further preferably 0.5 or less or 0.35 or less. The lower and upper limits of the molar proportion x can be arbitrarily selected and combined. The molar proportion x may be, for example, $0.008 \leq x \leq 0.52$, $0.01 \leq x \leq 0.5$, or $0.25 \leq x \leq 0.35$.

The molar proportion y of Ni per the total of the element L and Mg is 1.6 or more, preferably 1.8 or more, and further preferably 2 or more. Moreover, the molar proportion y is 4 or less, preferably 3.5 or less, and further preferably 3.3 or less. The lower and upper limits of the molar proportion y can be arbitrarily selected and combined. The molar proportion y may be, for example, $1.6 \leq y \leq 4$ or $2 \leq y \leq 3.5$.

The molar proportion $\alpha$ of Al per the total of the element L and Mg is 0.008 or more, preferably 0.01 or more, and further preferably 0.015 or more or 0.02 or more. The molar proportion $\alpha$ is 0.32 or less, preferably 0.3 or less, and further preferably 0.15 or less or 0.1 or less (or 0.07 or less). The lower and upper limits of the molar proportion $\alpha$ can be arbitrarily selected and combined. The molar proportion $\alpha$ may be, for example, $0.008 \leq \alpha \leq 0.3$, $0.01 \leq \alpha \leq 0.15$, or $0.01 \leq \alpha \leq 0.07$.

If x, y, and $\alpha$ fall outside the foregoing ranges, low-temperature discharge characteristics and/or high-temperature life characteristics would degrade.

Examples of the element $M^a$ include a combination of Ge and Y and/or Sn and a combination of Y and Sn. The element $M^a$ preferably includes at least Y and/or Sn. The total of Y and Sn in the element $M^a$ may be, for example, 80 to 100 mol %, and may preferably be 90 to 100 mol %. The element $M^a$ may include only Y and Sn. The element $M^a$ including at least Ge is also preferable. In that case, presumably, the alloy surface tends to be readily activated and the protective film tends to be readily formed. Note that the protective film formed on the alloy surface includes the element $M^a$, i.e., component(s) (e.g., an oxide, a hydroxide) including the element $M^a$. Such component(s) may be a composite oxide and/or composite hydroxide including two or more of the elements used for the element $M^a$.

Regarding the element $M^a$, Y has a high affinity for oxygen and the ability to reduce surrounding oxides. Therefore, when the element $M^a$ includes Y, corrosion of the hydrogen storage alloy, particularly corrosion at a high temperature, can be suppressed more effectively. Moreover, when the element $M^a$ includes at least Ge and Y, a composite hydroxide including these elements tends to form, and thus deterioration of the alloy can be suppressed more effectively.

The reducing ability of Y can be explained based on Pauling electronegativity. Pauling electronegativity serves as a scale which indicates the tendency of an atom to attract an electron. The binding energy between elements is relevant to the square of the difference between the Pauling electronegativities of the elements. The greater the difference between the electronegativities, the stronger the binding energy will be. The Pauling electronegativities of the elements in the foregoing hydrogen storage alloy is 1.2 for Y, 1.8 for Ni, 1.8 for Co, and 1.5 for Al. For O, the electronegativity is 3.5; and Y differs the most from O in electronegativity, and thus has a strong binding energy towards O. That is, Y evidently has a high affinity for oxygen.

Regarding the element $M^a$, Sn has the ability to suppress expansion and contraction of the alloy during absorption and release of hydrogen. Therefore, when the element $M^a$ includes Sn, excessive expansion and contraction of the alloy are suppressed during absorption and release of hydrogen, particularly at a high temperature. Thus, corrosion of the hydrogen storage alloy can be suppressed.

When the element $M^a$ is a combination of Y and Sn, the atom ratio of Y to Sn (Y:Sn) may be 1:0.5-2, preferably 1:0.7-1.5, and further preferably 1:0.8-1.2. When the element $M^a$ is a combination of Ge and another element (Y or Sn), the atom ratio of Ge to the another element (Ge:Y or Sn) may be, for example, 1:0.5-10, preferably 1:0.7-5, and further preferably 1:0.8-2.

When the element $M^a$ is a combination of Ge, Y, and Sn, the atom ratio among these elements (Ge:Y:Sn) may be, for example, 1:0.5-10:0.5-10, preferably 1:0.7-5:0.7-5, and further preferably 1:0.8-2:0.8-2.

The molar proportion $\beta$ of the element $M^a$ per the total of the element L and Mg is 0.01 or more, and preferably 0.015 or more. Moreover, the molar proportion $\beta$ is 0.12 or less, preferably 0.11 or less, and further preferably 0.1 or less. The lower and upper limits of the molar proportion $\beta$ can be arbitrarily selected and combined. The molar proportion $\beta$ may be, for example, $0.01 \leq \beta \leq 0.11$ or $0.01 \leq \beta \leq 0.1$.

When the molar proportion $\beta$ is in the foregoing range, it is possible to suppress capacity reduction which occurs due to excessive substitutions of the component elements of the alloy other than the element $M^a$, and/or durability reduction caused by introduction of lattice defects. Thus, as a result, it is possible to more effectively suppress degradation in cycle characteristics and/or storage characteristics even in a high-temperature environment such as when stored at a high-temperature. Moreover, even when the element $M^a$ includes Sn, it is possible to suppress excessive segregation of Sn as well as reduction in conductivity at a low temperature.

Elution of the component elements of the hydrogen storage alloy into an electrolyte may also be influenced by the crystal structure of the hydrogen storage alloy. The hydrogen storage alloy may have a crystal structure of, for example, $AB_2$-type, $AB_3$-type (i.e., $CeNi_3$-type), $AB_5$-type, or $A_2B_7$-type (i.e., $Ce_2Ni_7$-type). Particularly, the hydrogen storage alloy having a crystal structure of $AB_3$-type or $A_2B_7$-type (particularly $AB_3$-type) has a high hydrogen-absorbing ability and is thus suited for increasing electrode capacity.

The hydrogen storage alloy of the present invention has metallic bonds. Such alloy includes a combination of an element with a high affinity for hydrogen and an element with a low affinity for hydrogen. The element with a low affinity for hydrogen tends to be positioned in the B site, and serves to prevent formation of significant crystal defects when the alloy expands and contracts due to absorption and release of hydrogen. For example, in the hydrogen storage alloy having an $AB_3$-type or $A_2B_7$-type crystal structure, the element L and Mg are present in the A site, and Ni, Al, Ge, and other elements are present in the B site.

In the hydrogen storage alloy having an $AB_3$-type or $A_2B_7$-type crystal structure, the crystal structure is complicated and relatively unstable, and thus the component elements of the hydrogen storage alloy, such as Mg, may tend to be eluted. However, in the present invention, the addition of the element $M^a$ enables effective suppression of elution of the component elements, even when the hydrogen storage alloy used has an $AB_3$-type or $A_2B_7$-type crystal structure.

The hydrogen storage alloy can further include an element $M^b$ such as a transition metal element or a group 12, 13, 14, 15, or 16 element of the periodic table (with the exception of N), differing from the element L, Mg, Ni, Al, and the element $M^a$. In the hydrogen storage alloy having an $AB_3$-type or $A_2B_7$-type crystal structure, such element $M^b$ is present in the B site.

Examples of the element $M^b$ include: transition metal elements excluding Ni; group 12 elements, such as Zn; group 13 elements (e.g., B, Ga, In), excluding Al; group 14 elements (e.g., Si) excluding Ge and Sn; group 15 elements (e.g., P, Sb, Bi), excluding N; and group 16 elements (e.g., S).

Examples of the foregoing transition metal elements include: group 5 elements of the periodic table (V, Nb, Ta); group 6 elements (Cr, Mo, W); group 7 elements (e.g., Mn);

group 8 elements (e.g., Fe); group 9 elements (e.g., Co); group 10 elements (e.g., Pd); and group 11 elements (e.g., Cu, Ag). Among these transition metal elements, group 5 elements, group 6 elements, period 4 elements of groups 7 to 9 and 11 (Mn, Fe, Co, Cu), and Ag are preferable. Regarding the elements other than the transition metal elements, Zn, B, Ga, In and period 3 elements of groups 14 to 16 of the periodic table (Si, P, S) are preferable.

The element $M^b$ may be one of the foregoing elements, or two or more thereof in a combination.

Particularly, the element $M^b$ is preferably at least one selected from the group consisting of the foregoing transition metal elements (particularly V, Nb, Ta, Cr, Mo, W, Mn, Fe, Co, Cu, Ag), Zn, B, Ga, In, Si, and P. When the hydrogen storage alloy includes such element $M^b$, it is possible to more effectively suppress formation of significant crystal defects in association with absorption and release of hydrogen. Moreover, it is easier to obtain high charge/discharge characteristics, and in addition, to reduce costs.

The element $M^b$ preferably includes at least Co. When the element $M^b$ includes Co, although quantitative details are not clear, Co in the B site strengthens the bonds between Co and the elements surrounding Co; and it is thus possible to more effectively suppress formation of crystal defects in association with expansion and contraction of the alloy. Therefore, even with repeated charge and discharge, breaking of the alloy can be more effectively suppressed, thereby enabling degradation of life to be more effectively suppressed.

A molar proportion z of the element $M^b$ per the total of the element L and Mg is 0 or more, preferably 0.01 or more or 0.05 or more, and further preferably 0.1 or more or 0.2 or more. The molar proportion z is preferably 0.8 or less and further preferably 0.75 or less. The lower and upper limits of the molar proportion z can be arbitrarily selected and combined. The molar proportion z may be, for example, $0.01 \leq z \leq 0.8$ or $0.2 \leq z \leq 0.75$.

When the element $M^b$ includes Co, a molar proportion z1 of Co per the total of the element L and Mg is, for example, preferably $0.2 \leq z1 \leq 0.8$ and further preferably $0.25 \leq z1 \leq 0.75$.

When the molar proportion z of the element $M^b$ and the molar proportion z1 of Co are in the foregoing ranges, it is possible to more effectively suppress formation of crystal defects at the time of hydrogen absorption and release, and to also easily increase capacity due to easier securing of a hydrogen absorption site.

The hydrogen storage alloy may include an alkaline earth metal element $M^c$ other than Mg. Examples of such element $M^c$ include Ca, Sr, and Ba. Since such element $M^c$ easily forms ionically bonded hydrides, further increase in capacity can be expected from using the hydrogen storage alloy including the element $M^c$.

The element $M^c$ may include one, or two or more, of the foregoing alkaline earth metal elements.

The element $M^c$ preferably includes at least one selected from the group consisting of Sr and Ba. In the hydrogen storage alloy having an $AB_3$-type or $A_2B_7$-type crystal structure, the element $M^c$ is present in the A site.

A molar proportion w of the element $M^c$ per the total of the element L and Mg can be selected from the range of, for example, $0 \leq w \leq 0.5$ or $0.002 \leq w \leq 0.5$.

The molar proportion w is preferably adjusted such that the total of the molar proportion w of the element $M^c$ and the molar proportion x of Mg is in the foregoing range given for the molar proportion x. The total of the molar proportions (x+w) is preferably $0.01 \leq x+w \leq 0.54$ and further preferably $0.01 \leq x+w \leq 0.5$. When the total of x+w is in such ranges, hydrogen absorption is made easier, and thus capacity can be increased; and also, reduction in hydrogen-releasing ability is suppressed, and thus degradation of discharge characteristics (discharge characteristics at a low temperature in particular) of the battery is easily suppressed.

The hydrogen storage alloy may further include N. In the prior art, it has been presumed that introduction of N into a hydrogen storage alloy causes excessive formation of a nitride, thereby causing reduction in the capacity of the alloy. However, although the details are not clear, it was found that introduction of a small amount of N into a hydrogen storage alloy tended to cause increase in the degree of hydrogen transfer in the solid. This is assumed to be due to formation of a path starting from N in the crystal of the hydrogen storage alloy, thereby to allow hydrogen to pass therein. Due to improvement in the diffusion coefficient for hydrogen in the solid, discharge characteristics (discharge characteristics at a low temperature in particular) improves. Thus, due to using the hydrogen storage alloy including N, it is possible to reduce costs while also maintaining high charge/discharge characteristics.

A molar proportion v of N per the total of the element L and Mg is, for example, $0 \leq v \leq 0.01$, preferably $0.001 \leq v \leq 0.01$, and further preferably $0.003 \leq v \leq 0.01$. When the molar proportion v of N is in the foregoing range, it is easier to improve discharge characteristics, and in addition, to secure high capacity.

The hydrogen storage alloy can be exemplified by an alloy represented by, for example, compositional formula: $L_{1-x}Mg_xNi_yAl_\alpha M^a{}_\beta M^b{}_z M^c{}_w N_v$ (where L, $M^a$, $M^b$, $M^c$, x, y, $\alpha$, $\beta$, z, w, and v are the same as the foregoing).

The alloy powder for an electrode can be obtained by carrying out:

(i) a step A of forming an alloy from respective simple substances of the component elements of the hydrogen storage alloy;

(ii) a step B of granulating the alloy obtained in the step A; and (iii) a step C of activating the granulated product obtained in the step B.

(i) Step A (Alloying Process)

In the step A, an alloy can be formed from respective simple substances of its components by utilizing, for example, a known alloying method. Examples of such alloying method include plasma-arc melting, high-frequency melting (metal mold casting), mechanical alloying, mechanical milling, and quench solidification (i.e., methods mentioned in, for example, Handbook on Metal Materials (Industrial Research Center of Japan, 1999) such as roll spinning, melt drag, direct casting and rolling, spinning in rotating liquid, spray forming, gas atomization, wet spraying, splat quenching, thin quench-solidified ribbon pulverization, gas atomization/splat quenching, melt extraction, and a method using rotating electrodes). These methods may be used singly or in a combination of two or more.

In the step A, the respective simple substances of the component elements are mixed, and then the resultant mixture can be alloyed by using, for example, the foregoing method(s). Alternatively, the mixture may be heated and thereby melted, for alloying the component elements. For such alloying, for example, plasma-arc melting, high-frequency melting (metal mold casting), or quench solidification is suitable. Alternatively, quench solidification and mechanical alloying may be combined.

In the step A, in mixing the respective simple substances of the component elements, the molar proportion, mass proportion, and other factors of each of the simple substances are adjusted so that the hydrogen storage alloy ultimately has the intended composition. The hydrogen storage alloy including N can be obtained by carrying out the step A, or a sub-step (e.g., alloy solidifying process and/or ingot heating process, as described below) included in the step A, in a nitrogen atmosphere.

The molten alloy is solidified prior to granulation in the step B. The alloy solidification can be carried out by feeding the molten alloy into a casting mold and then leaving it to cool therein, as necessary. In view of increasing the dispersibility of the component elements in the alloy, the feed rate and other factors may be arbitrarily adjusted.

The solidified alloy (ingot) obtained may be heat treated as necessary. Due to this heat treatment, it is easier to adjust the dispersibility of the component elements in the hydrogen storage alloy, and it is thus possible to more effectively suppress elution and/or segregation of the component elements and to easily cause activation of the hydrogen storage alloy.

Heating conditions are not particularly limited, and heating can be carried out, for example, at a temperature ranging from 900 to 1100° C. in an atmosphere of inert gas such as argon.

(ii) Step B (Granulation Process)

In the step B, the alloy (i.e., ingot) obtained in the step A is granulated. The alloy granulation can be carried out, for example, by wet or dry pulverization. Wet and dry pulverization may also be combined. Pulverization can be carried out with, for example, a ball mill. In wet pulverization, the ingot is pulverized using a liquid medium such as water. The particles obtained may be sieved as necessary.

The average particle size of the alloy particles obtained is, for example, 5 to 50 μm, and preferably 5 to 30 μm. When the average particle size is in the foregoing range, the surface area of the hydrogen storage alloy can be maintained in a moderate range. Thus, it is possible to more effectively suppress reduction in corrosion resistance as well as lowering of hydrogen storage reactions. Note that in the present specification, the average particle size means a volume-based median diameter.

The alloy particles obtained in the step B may be referred to as a starting powder for the alloy powder for an electrode.

(iii) Step C (Activation Process)

In the step C, the pulverized product (starting powder) can be activated by being brought into contact with an aqueous alkaline solution. The manner in which contact is produced between the aqueous alkaline solution and the starting powder is not particularly limited, and contact can be produced by, for example: immersing the starting powder in the aqueous alkaline solution; adding the starting powder into the aqueous alkaline solution, followed by stirring; or spraying the aqueous alkaline solution to the starting powder. Activation may be carried out under heat, as necessary.

The aqueous alkaline solution can be an aqueous solution including, for example, an alkali metal hydroxide such as potassium hydroxide, sodium hydroxide, and/or lithium hydroxide, as an alkali. Among these hydroxides, sodium hydroxide and/or potassium hydroxide are preferably used.

In view of activation efficiency, productivity, and process reproducibility, the concentration of the alkali in the aqueous alkaline solution is, for example, 5 to 50 mass %, and preferably 10 to 45 mass %.

After activation by the aqueous alkaline solution, the alloy powder obtained may be washed with water. To reduce impurities that remain on respective surfaces of the particles of the alloy powder, washing is preferably completed after the pH of the water becomes 9 or lower.

The alloy powder after activation is usually dried.

The alloy powder for an electrode of the present invention can be obtained by carrying out the foregoing steps, and is suited for use as a negative electrode active material in an alkaline storage battery, due to enabling the battery to obtain both life characteristics, e.g., high-temperature life characteristics, and discharge characteristics, e.g., low-temperature discharge characteristics.

(Alkaline Storage Battery)

The alkaline storage battery comprises a positive electrode, a negative electrode, a separator interposed between the positive and negative electrodes, and an alkaline electrolyte.

The negative electrode includes the foregoing alloy powder for an electrode as a negative electrode active material.

The structure of the alkaline storage battery will be described below with reference to FIG. 1. FIG. 1 is a schematic, vertical sectional view of the structure of an alkaline storage battery according to an embodiment of the present invention. The alkaline storage battery includes: a bottom-closed, cylindrical battery case 4 also serving as a negative terminal; an electrode assembly housed in the battery case 4; and an alkaline electrolyte (not illustrated). Regarding the electrode assembly, a negative electrode 1, a positive electrode 2, and a separator 3 interposed therebetween are spirally wound. A sealing plate 7 provided with a safety valve 6 is arranged on the opening portion of the battery case 4, with an insulating gasket 8 interposed therebetween. The opening end portion of the battery case 4 is crimped inwards, thereby to hermetically seal the alkaline storage battery. The sealing plate 7 also serves as a positive terminal, and is electrically connected to the positive electrode 2 via a positive lead 9.

The foregoing alkaline storage battery can be obtained by placing the electrode assembly in the battery case 4; injecting the alkaline electrolyte; arranging the sealing plate 7 on the opening portion of the battery case 4, with the insulating gasket 8 interposed between the sealing plate 7 and the opening portion; and then sealing the opening end portion of the battery case 4, by crimping. At that time, the negative electrode 1 in the electrode assembly is electrically connected to the battery case 4 via a negative electrode current collector plate arranged between the electrode assembly and the inner bottom surface of the battery case 4. The positive electrode 2 in the electrode assembly is electrically connected to the sealing plate 7 via the positive lead 9.

In the present invention, the foregoing alloy powder for an electrode is used as the negative electrode active material. Therefore, a nickel-metal hydride battery is particularly preferable as the alkaline storage battery.

In the following, the components of the nickel-metal hydride battery will be described in more detail.

(Negative Electrode)

The negative electrode is not particularly limited as long as the foregoing alloy powder for an electrode is included therein as the negative electrode active material. The other components can be components known for use in nickel-metal hydride batteries.

The negative electrode may include: a core member; and the negative electrode active material adhering to the core member. Such negative electrode can be formed by causing a negative electrode paste including at least the negative electrode active material to adhere to the core member.

The negative electrode core member can be a known core member as exemplified by a porous or non-porous substrate formed of a material such as stainless steel or nickel or an alloy thereof. When the core member is a porous substrate, the active material may be filled in the pores of the core member.

The negative electrode paste typically includes a dispersion medium; and as necessary, may additionally include components known for use in negative electrodes, such as a conductive agent, a binder, and a thickener.

The negative electrode can be formed, for example, by applying the negative electrode paste to the core member; drying the resultant to remove the dispersion medium; and then pressing the resultant.

The dispersion medium can be a known medium such as water, an organic medium, or a mixed medium thereof.

The conductive agent is not particularly limited as long as it is of an electron-conductive material. Examples include: graphites such as natural graphite (e.g., graphite flakes), artificial graphite, and expanded graphite; carbon blacks such as acetylene black and Ketjen black; conductive fibers such as carbon fibers and metal fibers; metal particles such as copper powder; and conductive organic materials such as polyphenylene derivatives. These conductive agents may be used singly or in a combination of two or more. Among the foregoing, artificial graphite, Ketjen black, and carbon fibers are preferred.

The amount of the conductive agent is, for example, 0.01 to 50 parts by mass, preferably 0.1 to 30 parts by mass, and further preferably 0.1 to 10 parts by mass, per 100 parts by mass of the alloy powder for an electrode.

The conductive agent may be added to the negative electrode paste, to be mixed together with the other components. Alternatively, respective surfaces of particles of the alloy powder for an electrode may be coated with the conductive agent in advance. Coating of the respective surfaces with the conductive agent can be carried out by a known method such as: dredging the respective surfaces with the conductive agent; causing a dispersion including the conductive agent to adhere to the respective surfaces, followed by drying; or mechanically coating the respective surfaces with the conductive agent by a mechanochemical method.

Examples of the binder include resin materials such as: rubbery materials such as styrene-butadiene copolymer rubber (SBR); polyolefin resins such as polyethylene and polypropylene; fluorocarbon resins such as polytetrafluoroethylene, polyvinylidene fluoride, tetrafluoroethylene-hexafluoropropylene copolymer, and tetrafluoroethylene-perfluoroalkyl vinyl ether copolymer; and acrylic resins such as ethylene-acrylic acid copolymer, ethylene-methacrylic acid copolymer, ethylene-methyl acrylate copolymer, and cross-linked products with Na ions thereof. These binders can be used singly or in a combination of two or more.

The amount of the binder is, for example, 0.01 to 10 parts by mass, and preferably 0.05 to 5 parts by mass, per 100 parts by mass of the alloy powder for an electrode.

Examples of the thickener include: cellulose derivatives such as carboxymethyl cellulose (CMC), modified substances thereof (including salts such as Na salts), and methyl cellulose; saponified products of polymers having vinyl acetate units, such as polyvinyl alcohol; and polyalkylene oxides such as polyethylene oxides. These thickeners can be used singly or in a combination of two or more.

The amount of the thickener is, for example, 0.01 to 10 parts by mass, and preferably 0.05 to 5 parts by mass, per 100 parts by mass of the alloy powder for an electrode.

(Positive Electrode)

The positive electrode may include: a core member; and an active material or active material layer adhering to the core member. Alternatively, the positive electrode may be a sintered electrode containing an active material powder.

The positive electrode can be formed, for example, by causing a positive electrode paste including at least a positive electrode active material to adhere to the core member. More specifically, the positive electrode can be formed by applying the positive electrode paste to the core member; drying the resultant to remove a dispersion medium; and then pressing the resultant.

The positive electrode core member can be a known core member as exemplified by a porous substrate formed of nickel or a nickel alloy, such as a nickel foam or a sintered nickel plate.

The positive electrode active material is, for example, a nickel compound such as nickel hydroxide and/or nickel oxyhydroxide.

The positive electrode paste typically includes the dispersion medium, and as necessary, may additionally include components known for use in positive electrodes, such as a conductive agent, a binder, and a thickener. The dispersion medium, the conductive agent, the binder, the thickener, and their respective amounts can be selected from ones, or ranges, similar to those given for the negative electrode paste. The conductive agent may be a conductive cobalt oxide such as cobalt hydroxide or γ-cobalt oxyhydroxide. The positive electrode paste may include, for example, a metal compound (e.g., an oxide or hydroxide) such as zinc oxide or zinc hydroxide, as an additive.

(Others)

The separator can be a microporous film or a non-woven fabric made of polyolefin such as polyethylene or polypropylene.

The alkaline electrolyte is, for example, an aqueous solution including an alkaline solute. Examples of such solute include alkali metal hydroxides such as lithium hydroxide, potassium hydroxide, and sodium hydroxide. These can be used singly or in a combination of two or more. The alkaline electrolyte preferably includes at least potassium hydroxide and preferably further includes sodium hydroxide and/or lithium hydroxide, as the alkaline solute.

The specific gravity of the alkaline electrolyte is, for example, 1.03 to 1.55, and preferably 1.11 to 1.32.

EXAMPLES

In the following, the present invention will be specifically described by way of Examples and Comparative Examples. The following Examples, however, are not to be construed as limiting in any way the scope of the present invention.

Example 1

(1) Preparation of Starting Powder

Respective simple substances of La as an element L, Mg, Ni, Al, Y and Ge as an element $M^a$, and Co as an element $M^b$ were mixed such that their contents corresponded to the coefficient ratio shown in Table 1; and then the resultant was melted in a high-frequency melting furnace. The atom ratio of Y to Ge was Y:Ge=1:1.

The molten metal was poured into a casting mold to produce an ingot. The ingot obtained was heated in an argon atmosphere at 1060° C. for 10 hours. The heated ingot was pulverized into coarse particles. The coarse particles obtained were pulverized in presence of water, by using a wet ball mill; and the resultant in a moist state was put through a sieve with a mesh opening size of 75 μm, thereby to obtain a starting powder including a hydrogen storage alloy with an average particle size of 20 μm.

(2) Preparation of Alloy Powder for Electrode

The starting powder obtained in (1) above was mixed with an aqueous alkaline solution of 100° C. including sodium hydroxide at a concentration of 40 mass %; and the resultant was kept stirred for 50 minutes. The powder obtained was collected, washed with warm water, dehydrated, and then dried. Washing was carried out until the pH of the warm water after use became 9 or lower. As a result, an alloy powder for an electrode, from which impurities were removed, was obtained. The hydrogen storage alloy for the alloy powder for an electrode was able to be represented by compositional formula: $La_{1-x}Mg_xNi_yAl_\alpha M^a{}_\beta Co_{z1}$. The crystal structure of the hydrogen storage alloy was observed by X-ray diffraction, and was observed to be that of $AB_3$-type.

(3) Production of Negative Electrode

To 100 parts by mass of the alloy powder for an electrode obtained in (2) above, 0.15 part by mass of CMC (degree of etherification: 0.7, degree of polymerization: 1600), 0.3 part by mass of acetylene black, and 0.7 part by mass of SBR were added, and water was further added, followed by kneading, thereby to prepare a negative electrode paste. The negative electrode paste obtained was applied to both surfaces of a core member made of a punched metal of nickel-plated iron (thickness: 60 μm, pore diameter: 1 mm, porosity: 42%). The coating of the paste was dried; and then pressed together with the core member, with rollers. In such a manner, a negative electrode having a thickness of 0.4 mm, width of 35 mm, and capacity of 2200 mAh was obtained. A portion exposing the core member was formed at one lengthwise end portion of the negative electrode.

(4) Production of Positive Electrode

A positive electrode material mixture was filled in a positive electrode core member formed of a sintered porous substrate, thereby to produce a sintered positive electrode having a capacity of 1500 mAh. The positive electrode material mixture included about 90 parts by mass of $Ni(OH)_2$ (positive electrode active material), about 6 parts by mass of $Zn(OH)_2$ as an additive, and about 4 parts by mass of $Co(OH)_2$ as a conductive agent. A portion exposing the positive electrode core member, without the active material retained therein, was formed at one lengthwise end portion of the positive electrode core member.

(5) Production of Nickel-Metal Hydride Battery

Using the negative and positive electrodes obtained above, a nickel-metal hydride battery as illustrated in FIG. 1 having a size 4/5A and nominal capacity of 1500 mAh was produced. Specifically, the positive electrode 2 and the negative electrode 1 were wound with a separator 3 interposed therebetween, thereby to produce a columnar electrode plate assembly. Regarding the electrode plate assembly, the portion exposing the positive electrode core member and the portion exposing the negative electrode core member were exposed at end surfaces, respectively, on opposite sides. The separator 3 was a non-woven fabric (thickness: 100 μm) made of sulfonated polypropylene. A positive lead 9 was welded to the end surface of the electrode plate assembly where the positive electrode core member was exposed.

A negative electrode current collector plate was welded to the end surface of the electrode plate assembly where the negative electrode core member was exposed. A sealing plate 7 was electrically connected to the positive electrode 2 via the positive lead 9. Thereafter, the electrode plate assembly, with the negative electrode current collector plate on the lower side, was placed in a battery case 4 being a bottom-closed, cylindrical can. A negative lead connected to the negative electrode current collector plate was welded to the bottom portion of the battery case 4. After an electrolyte was injected into the battery case 4, the opening portion of the battery case 4 was sealed with the sealing plate 7 provided with a gasket 8 at the peripheral portion, thereby to complete a nickel-metal hydride battery.

As the electrolyte, an aqueous alkaline solution (specific gravity: 1.23) including 1 mass % of potassium hydroxide, 15 mass % of sodium hydroxide, and 0.1 mass % of lithium hydroxide as alkalis, was used.

Examples 2 to 20 and Comparative Examples 1 to 8

A starting powder was obtained in the same manner as Example 1, except that in the step (1) in Example 1, the respective simple substances of the component elements were mixed such that their contents corresponded to the coefficient ratio shown in Table 1. Except for using the starting powder obtained, a negative electrode and a nickel-metal hydride battery were produced in the same manner as Example 1.

Examples 21 to 23 and Comparative Examples 9 to 11

A starting powder was obtained in the same manner as Example 1, except that in the step (1) in Example 1, element(s) shown in Table 1 were used as the element $M^a$. Except for using the starting powder obtained, a negative electrode and a nickel-metal hydride battery were produced in the same manner as Example 1. When the element $M^a$ included two elements, the atom ratio therebetween was 1:1. When the element $M^a$ included three elements, the atom ratio thereamong was 1:1:1.

The following evaluations were performed on the alloy powder for an electrode and the nickel-metal hydride battery obtained for each of the Examples and Comparative Examples.

(a) High-Temperature Life Characteristics

In a 40° C. environment, the nickel-metal hydride battery of each of the Examples and Comparative Examples was charged at a 10-hour rate (150 mA) for 15 hours, and then discharged at a 5-hour rate (300 mA) until the battery voltage became 1.0 V. This charge/discharge cycle was repeated 100 times. The rate of the discharge capacity at the $100^{th}$ cycle to the discharge capacity at the $2^{nd}$ cycle was obtained in percentage as the capacity retention rate.

(b) Low-Temperature Discharge Characteristics

The nickel-metal hydride battery for each of the Examples and Comparative Examples was charged at 20° C. and a current of 0.75 A until the capacity became 120% of the theoretical capacity, and then discharged at 20° C. and a current of 1.5 A until the battery voltage dropped to 1.0 V. The capacity at that time (initial discharge capacity) was measured.

Furthermore, the nickel-metal hydride battery was charged at 20° C. and a current of 0.75 A until the capacity became 120% of the theoretical capacity, and then discharged at 0° C. and a current of 1.5 A until the battery voltage dropped to 1.0 V. The capacity at that time (low-temperature discharge capacity) was measured.

The low-temperature discharge capacity was divided by the initial discharge capacity and expressed in percentage, and the obtained value served as an index for low-temperature discharge characteristics.

temperature life characteristics did not improve sufficiently (Comparative Examples 10 and 11).

Examples 24 and 25

A starting powder was obtained in the same manner as Example 1, except that in the step (1) for preparing a starting

TABLE 1

| | $La_{1-x}Mg_xNi_yAl_\alpha M^\alpha_\beta Co_{z1}$ | | | | | High-temperature life characteristics (%) | Low-temperature discharge characteristics (%) |
|---|---|---|---|---|---|---|---|---|
| | x | y | α | $M^\alpha$ | β | z1 | | |
| Comp. Ex. 1 | 0.005 | 2.75 | 0.03 | Y + Ge | 0.02 | 0.3 | 56.0 | 67 |
| Ex. 1 | 0.01 | | | | | | 84.8 | 87 |
| Ex. 2 | 0.3 | | | | | | 85.2 | 87 |
| Ex. 3 | 0.5 | | | | | | 82.7 | 87 |
| Comp. Ex. 2 | 0.6 | | | | | | 65.0 | 70 |
| Comp. Ex. 3 | 0.3 | 1 | 0.03 | Y + Ge | 0.02 | 0.3 | 68.9 | 73 |
| Ex. 4 | | 2 | | | | | 81.3 | 88 |
| Ex. 5 | | 2.5 | | | | | 81.6 | 87 |
| Ex. 6 | | 3 | | | | | 83.4 | 86 |
| Comp. Ex. 4 | | 5.2 | | | | | 49.6 | 65 |
| Comp. Ex. 5 | 0.3 | 2.75 | 0.005 | Y + Ge | 0.02 | 0.3 | 63.4 | 69 |
| Ex. 7 | | | 0.01 | | | | 84.7 | 87 |
| Ex. 8 | | | 0.02 | | | | 85.5 | 87 |
| Ex. 9 | | | 0.05 | | | | 84.6 | 85 |
| Ex. 10 | | | 0.1 | | | | 83.2 | 82 |
| Ex. 11 | | | 0.15 | | | | 80.0 | 81 |
| Ex. 12 | | | 0.3 | | | | 77.5 | 80 |
| Comp. Ex. 6 | | | 0.35 | | | | 58.8 | 69 |
| Comp. Ex. 7 | 0.3 | 2.75 | 0.03 | Y + Ge | 0 | 0.3 | 53.3 | 68 |
| Ex. 13 | | | | | 0.01 | | 72.9 | 78 |
| Ex. 14 | | | | | 0.05 | | 80.6 | 84 |
| Ex. 15 | | | | | 0.1 | | 81.3 | 81 |
| Comp. Ex. 8 | | | | | 0.15 | | 65.5 | 71 |
| Ex. 16 | 0.3 | 2.75 | 0.03 | Y + Ge | 0.02 | 0.2 | 81.2 | 80 |
| Ex. 17 | | | | | | 0.25 | 85.6 | 84 |
| Ex. 18 | | | | | | 0.5 | 85.6 | 87 |
| Ex. 19 | | | | | | 0.75 | 84.5 | 88 |
| Ex. 20 | | | | | | 1 | 79.3 | 83 |
| Comp. Ex. 9 | 0.3 | 2.75 | 0.03 | Ge | 0.02 | 0.3 | 53 | 75.2 |
| Comp. Ex. 10 | | | | Y | | | 69 | 67.4 |
| Comp. Ex. 11 | | | | Sn | | | 65 | 68 |
| Ex. 21 | | | | Y + Sn | | | 85 | 79 |
| Ex. 22 | | | | Y + Ge + Sn | | | 83 | 86 |
| Ex. 23 | | | | Ge + Sn | | | 80 | 83 |

As evidenced in Table 1, in each of the Examples in which the respective coefficients (molar proportions) of Mg, Ni, Al, and the element $M^\alpha$ were in specific ranges, the high-temperature life characteristics and the low-temperature discharge characteristics were both high, which indicated that both of these characteristics were obtained at a high level. In contrast, in each of the Comparative Examples in which the respective molar proportions of the foregoing elements fell outside the specific ranges, the high-temperature life characteristics and/or the low-temperature discharge characteristics degraded, and both of these characteristics could not be obtained.

Even when the element $M^\alpha$ was Y and Sn; Y, Ge, and Sn; or Ge and Sn, a similar effect as when the element $M^\alpha$ was Y and Ge was obtained. In contrast, in Comparative Example 9 in which the element $M^\alpha$ included only Ge, a certain degree of low-temperature discharge characteristics was obtained, but the high-temperature life characteristics degraded. Moreover, when the element $M^\alpha$ was Sn or Y, both the low-temperature discharge characteristics and the high-powder in Example 1, the element shown in Table 2 was added as an element $M_c$. Except for using the starting powder obtained, a negative electrode and a nickel-metal hydride battery were produced in the same manner as Example 1, and evaluated in the same manner as the foregoing.

Example 26

A starting powder was obtained in the same manner as Example 1, except that in the step (1) for preparing a starting powder in Example 1, cooling of the molten metal in the casting mold was carried out in a nitrogen gas atmosphere. Except for using the starting powder obtained, a negative electrode and a nickel-metal hydride battery were obtained in the same manner as Example 1, and evaluated in the same manner as the foregoing. A molar proportion v of N in the alloy powder for an electrode was measured by using an inert gas fusion-thermal conductivity method (Thermal Conductivity Detector (TCD)), the result being 0.008.

The results of Examples 24 to 26 are shown in Table 2.

TABLE 2

| | $La_{0.7}Mg_xNi_{2.75}Al_{0.03}M^a{}_{0.02}Co_{0.3}M^c{}_wN_v$ | | | | High-temperature life characteristics (%) | Low-temperature discharge characteristics (%) |
|---|---|---|---|---|---|---|
| | $M^c$ | x | w | v | | |
| Ex. 24 | Sr | 0.29 | 0.008 | 0 | 85 | 89 |
| Ex. 25 | Ba | 0.29 | 0.008 | 0 | 84 | 87 |
| Ex. 26 | — | 0.3 | 0 | 0.008 | 81 | 80 |

As shown in Table 2, in Examples 24 to 26, high high-temperature life characteristics and excellent low-temperature discharge characteristics were obtained. In Examples 24 and 25 which used a hydrogen storage alloy including Sr or Ba as the element $M^c$, considerable effect was obtained also in terms of capacity increase.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

In the present invention, it is possible to obtain an alloy powder for an electrode which enables an alkaline storage battery to have both high discharge characteristics (e.g., low-temperature discharge characteristics) and excellent life characteristics (e.g., high-temperature life characteristics). Such alloy powder for an electrode enables obtaining high battery characteristics over a wide range of temperatures. Therefore, there are expectations for the alloy powder to be utilized in products serving as alternatives for dry-cell batteries, and in respective power sources for various devices; and to be applied to, for example, a power source for hybrid vehicles used in harsh environments.

REFERENCE SIGNS LIST 1 negative electrode
2 positive electrode
3 separator
4 battery case
6 safety valve
7 sealing plate
8 insulating gasket
9 positive lead

The invention claimed is:

1. An alkaline storage battery comprising:
a positive electrode;
a negative electrode;
a separator interposed between the positive electrode and the negative electrode; and
an alkaline electrolyte, wherein:
the negative electrode includes a negative electrode active material containing an alloy powder,
the alloy powder comprises a hydrogen storage alloy,
the hydrogen storage alloy includes an element L, Mg, Ni, Al, an element $M^a$, and an element $M^b$,
the element L is at least one selected from the group consisting of group 3 elements and group 4 elements of the periodic table, excluding Y,
the element $M^a$ is a combination of Y and Sn,
the element $M^b$ is at least one selected from the group consisting of V, Nb, Ta, Cr, Mo, W, Mn, Fe, Cu, Ag, Zn, B, Ga, In, Si, and P,
a molar proportion x of Mg in a total of the element L and Mg is $0.008 \leq x \leq 0.54$,
a molar proportion y of Ni per the total of the element L and Mg is $1.6 \leq y \leq 4$,
a molar proportion $\alpha$ of Al per the total of the element L and Mg is $0.008 \leq \alpha \leq 0.32$,
a molar proportion $\beta$ of the element $M^a$ per the total of the element L and Mg is $0.01 \leq \beta \leq 0.12$,
a molar proportion z of the element $M^b$ per the total of the element L and Mg is $0.01 \leq z \leq 0.8$, and
an atomic ratio of Y to Sn (Y:Sn) is 1:0.5-2.

2. The alkaline storage battery in accordance with claim 1, wherein:
the hydrogen storage alloy further includes an element $M^c$,
the element $M^c$ is at least one selected from the group consisting of Sr and Ba, and
the molar proportion x of Mg and a molar proportion w of $M^c$ per the total of the element L and Mg satisfy $0.01 \leq x+w \leq 0.5$.

3. The alkaline storage battery in accordance with claim 1, wherein the molar proportion x of Mg is $0.25 \leq x \leq 0.35$.

4. The alkaline storage battery in accordance with claim 1, wherein:
the hydrogen storage alloy further includes N, and
a molar proportion v of N per the total of the element L and Mg is $0.001 \leq v \leq 0.01$.

5. The alkaline storage battery in accordance with claim 1, wherein a crystal structure of the hydrogen storage alloy is an $AB_3$ crystal structure or $A_2B_7$ crystal structure.

6. An alkaline storage battery comprising:
a positive electrode;
a negative electrode;
a separator interposed between the positive electrode and the negative electrode; and
an alkaline electrolyte, wherein:
the negative electrode includes a negative electrode active material containing an alloy powder,
the alloy powder comprises a hydrogen storage alloy,
the hydrogen storage alloy includes an element L, Mg, Ni, Al, an element $M^a$, and an element $M^b$,
the element L is at least one selected from the group consisting of group 3 elements and group 4 elements of the periodic table, excluding Y,
the element $M^a$ is a combination of Ge and another element, Y or Sn, the element $M^b$ is at least one selected from the group consisting of V, Nb, Ta, Cr, Mo, W, Mn, Fe, Cu, Ag, Zn, B, Ga, In, Si, and P, a molar proportion x of Mg in a total of the element L and Mg is $0.008 \leq x \leq 0.54$, a molar proportion y of Ni per the total of the element L and Mg is $1.6 \leq y \leq 4$, a molar proportion α of Al per the total of the element L and Mg is $0.008 \leq \alpha \leq 0.32$, a molar proportion β of the element $M^a$ per the total of the element L and Mg is $0.01 \leq \beta \leq 0.12$, a molar proportion z of the element $M^b$ per the total of the element L and Mg is $0.01 \leq z \leq 0.8$, and an atomic ratio of Ge to the another element (Ge:Y or Sn) is 1:0.5-10.

7. The alkaline storage battery in accordance with claim 6, wherein:

the hydrogen storage alloy further includes an element $M^c$, the element $M^c$ is at least one selected from the group consisting of Sr and Ba, and the molar proportion x of Mg and a molar proportion w of $M^c$ per the total of the element L and Mg satisfy $0.01 \leq x+w \leq 0.5$.

8. The alkaline storage battery in accordance with claim 6, wherein the molar proportion x of Mg is $0.25 \leq x \leq 0.35$.

9. The alkaline storage battery in accordance with claim 6, wherein:

the hydrogen storage alloy further includes N, and a molar proportion v of N per the total of the element L and Mg is $0.001 \leq v \leq 0.01$.

10. The alkaline storage battery in accordance with claim 6, wherein a crystal structure of the hydrogen storage alloy is an $AB_3$ crystal structure or $A_2B_7$ crystal structure.

11. An alkaline storage battery comprising:

a positive electrode;

a negative electrode;

a separator interposed between the positive electrode and the negative electrode; and an alkaline electrolyte, wherein:

the negative electrode includes as a negative electrode active material containing an alloy powder, the alloy powder comprises a hydrogen storage alloy, the hydrogen storage alloy includes an element L, Mg, Ni, Al, an element $M^a$, and an element $M^b$, the element L is at least one selected from the group consisting of group 3 elements and group 4 elements of the periodic table, excluding Y, the element $M^a$ is a combination of Ge, Y, and Sn, the element $M^b$ is at least one selected from the group consisting of V, Nb, Ta, Cr, Mo, W, Mn, Fe, Cu, Ag, Zn, B, Ga, In, Si, and P, a molar proportion x of Mg in a total of the element L and Mg is $0.008 \leq x \leq 0.54$, a molar proportion y of Ni per the total of the element L and Mg is $1.6 \leq y \leq 4$, a molar proportion α of Al per the total of the element L and Mg is $0.008 \leq \alpha \leq 0.32$, a molar proportion β of the element $M^a$ per the total of the element L and Mg is $0.01 \leq \beta \leq 0.12$, a molar proportion z of the element $M^b$ per the total of the element L and Mg is $0.01 \leq z \leq 0.8$, and an atomic ratio among Ge, Y, and Sn (Ge:Y:Sn) is 1:0.5-10:0.5-10.

12. The alkaline storage battery in accordance with claim 11, wherein:

the hydrogen storage alloy further includes an element $M^c$, the element $M^c$ is at least one selected from the group consisting of Sr and Ba, and the molar proportion x of Mg and a molar proportion w of $M^c$ per the total of the element L and Mg satisfy $0.01 \leq x+w \leq 0.5$.

13. The alkaline storage battery in accordance with claim 11, wherein the molar proportion x of Mg is $0.25 \leq x \leq 0.35$.

14. The alkaline storage battery in accordance with claim 11, wherein:

the hydrogen storage alloy further includes N, and a molar proportion v of N per the total of the element L and Mg is $0.001 \leq v \leq 0.01$.

15. The alkaline storage battery in accordance with claim 11, wherein a crystal structure of the hydrogen storage alloy is an $AB_3$ crystal structure or $A_2B_7$ crystal structure.

* * * * *